United States Patent
Guzman Colin et al.

(10) Patent No.: US 10,723,280 B2
(45) Date of Patent: Jul. 28, 2020

(54) DOUBLE HOOK ATTACHMENT SYSTEM

(71) Applicant: Ford Global Technologies, LLC, Dearborn, MI (US)

(72) Inventors: Jose Manuel Guzman Colin, Izcalli (MX); Luis Humberto Soni Gutierrez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 16/122,115

(22) Filed: Sep. 5, 2018

(65) Prior Publication Data

US 2019/0016273 A1 Jan. 17, 2019

Related U.S. Application Data

(62) Division of application No. 15/067,606, filed on Mar. 11, 2016, now Pat. No. 10,183,631.

(51) Int. Cl.
*B60R 11/02* (2006.01)
*B60R 11/00* (2006.01)

(52) U.S. Cl.
CPC ... *B60R 11/0252* (2013.01); *B60R 2011/0015* (2013.01); *B60R 2011/0064* (2013.01); *B60R 2011/0276* (2013.01)

(58) Field of Classification Search
CPC . B60R 11/02; B60R 11/0252; B60R 11/0235; G06F 1/16; B60N 2/42709
See application file for complete search history.

(56) References Cited

U.S. PATENT DOCUMENTS

| | | | |
|---|---|---|---|
| 4,525,899 A | 7/1985 | Carroll | |
| 4,534,089 A | 8/1985 | Swan | |
| 5,826,312 A | 10/1998 | Schröder et al. | |
| 6,074,150 A | 6/2000 | Shinozaki et al. | |
| 6,481,682 B2 | 11/2002 | Miura | |
| 6,698,832 B2 | 3/2004 | Boudinot | |
| 6,739,654 B1 * | 5/2004 | Shen | B60R 11/0235 297/188.04 |
| 6,880,793 B2 | 4/2005 | Huang et al. | |
| 6,956,628 B2 * | 10/2005 | Huang | B60R 11/0235 349/149 |
| 7,448,679 B2 | 11/2008 | Chang | |
| 7,591,508 B2 | 9/2009 | Chang | |
| 7,866,746 B2 * | 1/2011 | Watanabe | B60R 11/0235 297/217.3 |
| 7,901,002 B2 | 3/2011 | Mashimo | |
| 8,109,569 B2 | 2/2012 | Mitchell | |
| 8,141,948 B2 | 3/2012 | Cassellia et al. | |
| 8,282,060 B2 * | 10/2012 | Fan | F16M 11/041 248/121 |
| 8,424,825 B2 | 4/2013 | Somuah | |
| 8,590,965 B2 | 11/2013 | Beyer et al. | |

(Continued)

*Primary Examiner* — Brian D Nash
(74) *Attorney, Agent, or Firm* — David Coppiellie; Brooks Kushman, P.C.

(57) ABSTRACT

A tablet device holder assembly may include a housing defining a housing opening and including a housing lip arranged on a first side of the housing above the housing opening, and a removable bezel having a projection configured to extend through the housing opening and defining a projection opening that when the bezel is rotated to an installed state, the lip is received within the projection opening to maintain the bezel on the housing.

15 Claims, 4 Drawing Sheets

(56) References Cited

U.S. PATENT DOCUMENTS

| | | | |
|---|---|---|---|
| 8,851,565 B2* | 10/2014 | Hontz | B60N 3/004 |
| | | | 297/188.04 |
| 9,452,717 B2* | 9/2016 | Dry | B60R 11/02 |
| 9,555,726 B2* | 1/2017 | Jafri | B64D 11/0015 |
| 9,760,116 B2* | 9/2017 | Wylie | G06F 1/1654 |
| 9,845,912 B2 | 12/2017 | Phillips et al. | |
| 2005/0105987 A1 | 5/2005 | Giugliano et al. | |
| 2006/0214468 A1 | 9/2006 | Cass et al. | |
| 2007/0101372 A1 | 5/2007 | Chang | |
| 2008/0238169 A1 | 10/2008 | Hicks et al. | |
| 2012/0018471 A1 | 1/2012 | Guillermo et al. | |
| 2015/0108798 A1 | 4/2015 | Boyer, Jr. | |
| 2015/0202999 A1 | 7/2015 | Jafri et al. | |
| 2017/0021931 A1* | 1/2017 | Stephens | B64D 11/0638 |
| 2017/0120840 A1* | 5/2017 | Harris | B60R 11/02 |
| 2017/0159688 A1* | 6/2017 | Soni Gutierrez | F16B 5/12 |
| 2017/0259752 A1* | 9/2017 | Guzman Colin | B60R 11/0252 |

\* cited by examiner

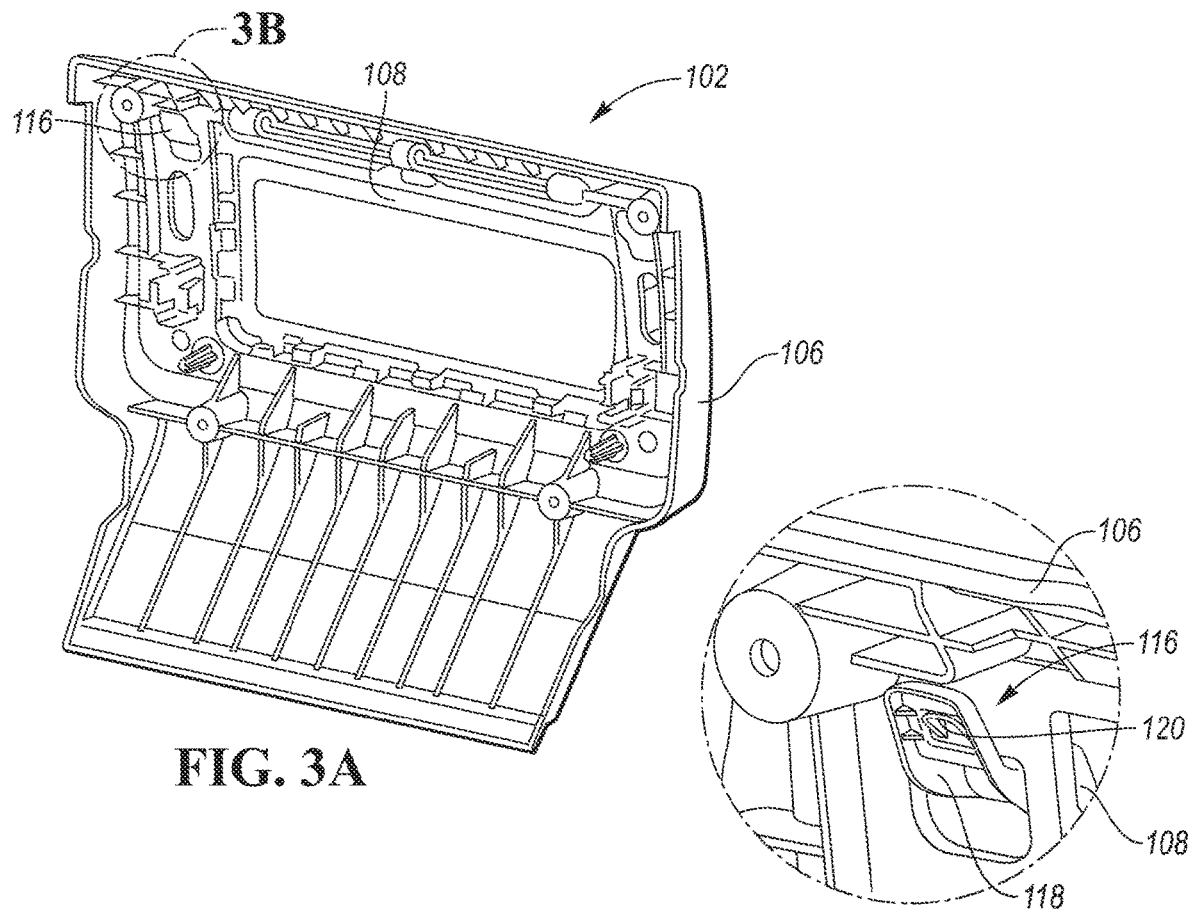
FIG. 3A
FIG. 3B
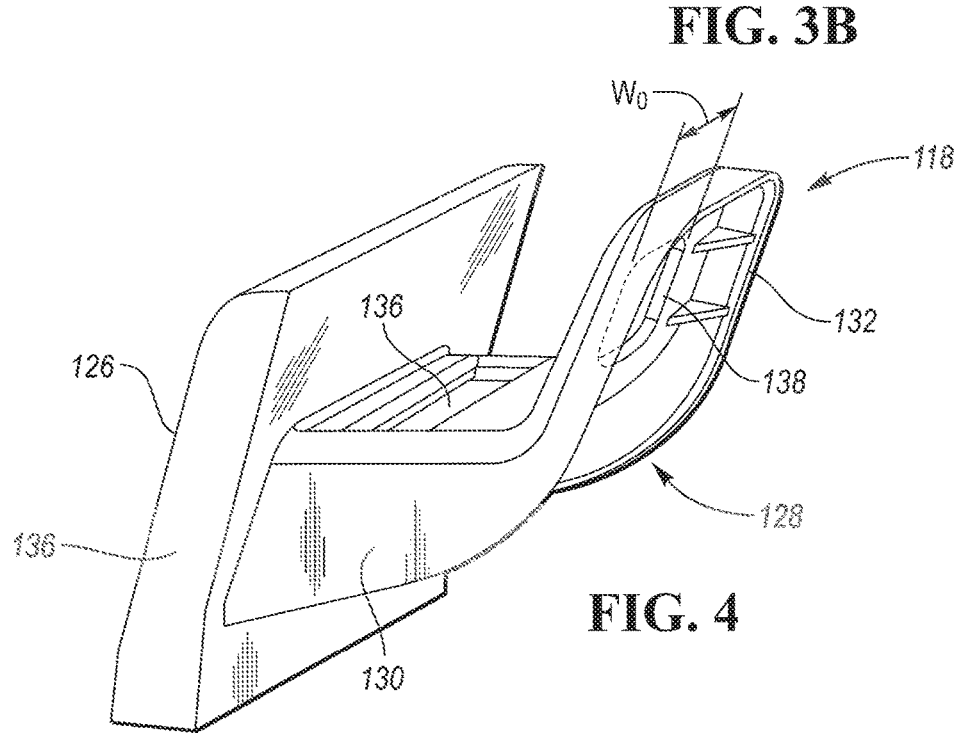
FIG. 4

DOUBLE HOOK ATTACHMENT SYSTEM

CROSS-REFERENCE TO RELATED APPLICATIONS

This application is a division of U.S. application Ser. No. 15/067,606 filed Mar. 11, 2016, now U.S. Pat. No. 10,183,631 issued on Jan. 22, 2019, the disclosure of which is hereby incorporated in its entirety by reference herein.

TECHNICAL FIELD

Double hook attachment systems are disclosed.

BACKGROUND

Vehicle seating often includes various features such as trays, drink holders, multi-media holders, etc. With the increased use of tablet computers and mobile devices, tablet device holders may also be included in vehicles.

SUMMARY

A tablet device holder assembly may include a housing defining a housing opening and including a housing lip arranged on a first side of the housing above the housing opening, and a removable bezel having a projection configured to extend through the housing opening and defining a projection opening that when the bezel is rotated to an installed state, the lip is received within the projection opening to maintain the bezel on the housing.

An attachment mechanism may include a housing part defining a housing opening and having a lip extending outwardly from a first side and a hook extending outwardly downward from an opposite second side, and a bezel part having an L-shaped projection extending outward therefrom, the projection defining a first opening at a first portion and a second opening at a second portion, the first opening configured to receive the hook and the second opening configured to receive the lip to fix the bezel part to the housing part in an installed state.

An attachment mechanism may include a first part defining an opening and having a lip extending outwardly from a first side of the first part, and a second part having a projection defining a projection opening configured be received by the opening at the first side and to receive the lip to fix the second part to the first part in an installed state.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIGS. 3A and 3B are perspective views of a rear portion of the tablet device holder illustrating an attachment mechanism;

FIG. 4 is a perspective view of the bezel part of the attachment mechanism of FIGS. 3A and 3B;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Tablet and mobile device usage is increasing. During traveling, passengers may wish to use their tablet devices to play games, watch movies, listen to music, etc. Tablets may be arranged on the seatback of a vehicle seat to be accessible to passengers in the rear seat. Tablet covers may fix the tablet to the back of the seat to allow for hands-free viewing of the tablet.

A tablet device holder of at least one embodiment includes a housing and a bezel wherein the bezel is configured to attach to the housing and maintain the tablet within the housing. To do this, the bezel and housing may each include respective parts of an attachment mechanism. The attachment mechanism may fix the bezel to the housing and restrict movement of the bezel with respect to the housing while maintaining the tablet therebetween. The attachment mechanism may include a double hook assembly designed to allow the bezel and the housing to be parallel to each other and restrict movement of the bezel in all directions. The attachment mechanism may be injection molded such that no additional action or slide on the mold may be necessary to manufacture the attachment mechanism. The attachment mechanism may have a high retention force capability to avoid movement between the two parts (i.e., the bezel and the housing).

The housing may define an opening and a lip while the bezel may define a projection. The projection may be inserted through the opening of the housing and engage with the lip. Concurrently, a hook arranged on the housing may be received by an opening in the projection. The hook may prevent axial movement of the bezel with respect to the housing while the lip may prevent lateral movement of the bezel with respect to the housing. Thus, the attachment mechanism forms a secure and strong fit between the bezel and the housing to avoid undesired separation of the parts. Furthermore, during attachment of the bezel to the housing, the hook and openings guide the projection into a fixed position without undo force or requiring calibration by the user. Additional fasteners or secondary parts are also not necessary to fix the tablet to the seat back, avoiding additional complex design features and costly parts.

Figure 1:
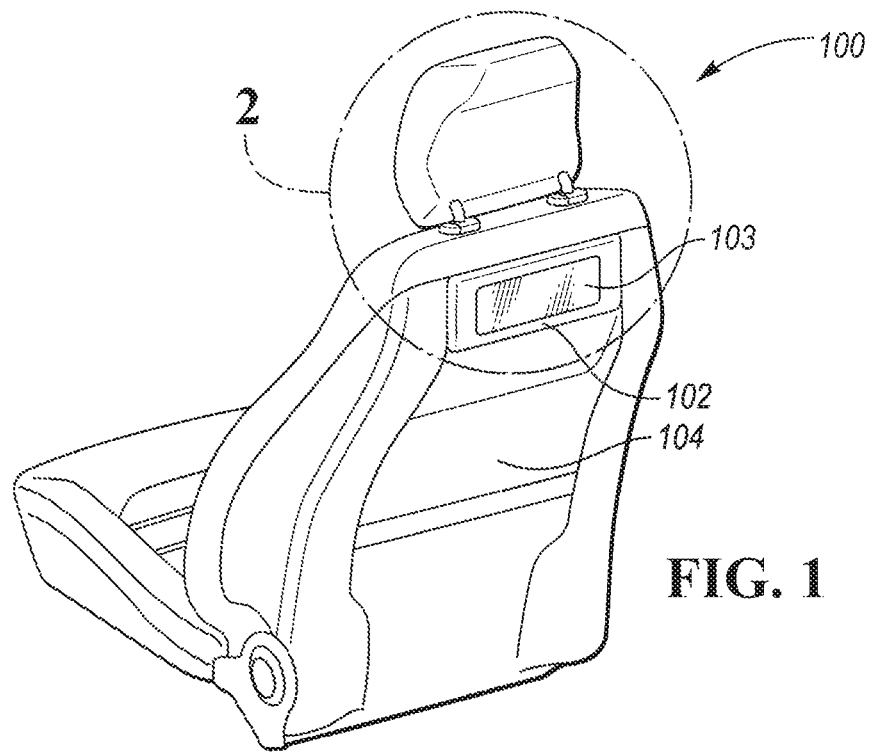
FIG. 1 is a perspective view of a tablet device holder arranged on a seat assembly.

FIG. 1 is a perspective view of a tablet device holder 102 arranged on a seat assembly 100. The tablet device holder 102 may be arranged on a rear portion 104 of the seat assembly 100 to be accessible to passengers in a rear seat of the vehicle. The device holder 102 may be configured to hold a user device 103 (also referred to as tablet 103) or a mobile device such as an IPAD, ITOUCH, KINDLE, AMAZON FIRE, YOGA TAB 3 PRO, SURFACE PRO, XPERIA, NEXUS, ENCORE, ZENPAD, GETAC, etc.

Figure 2:
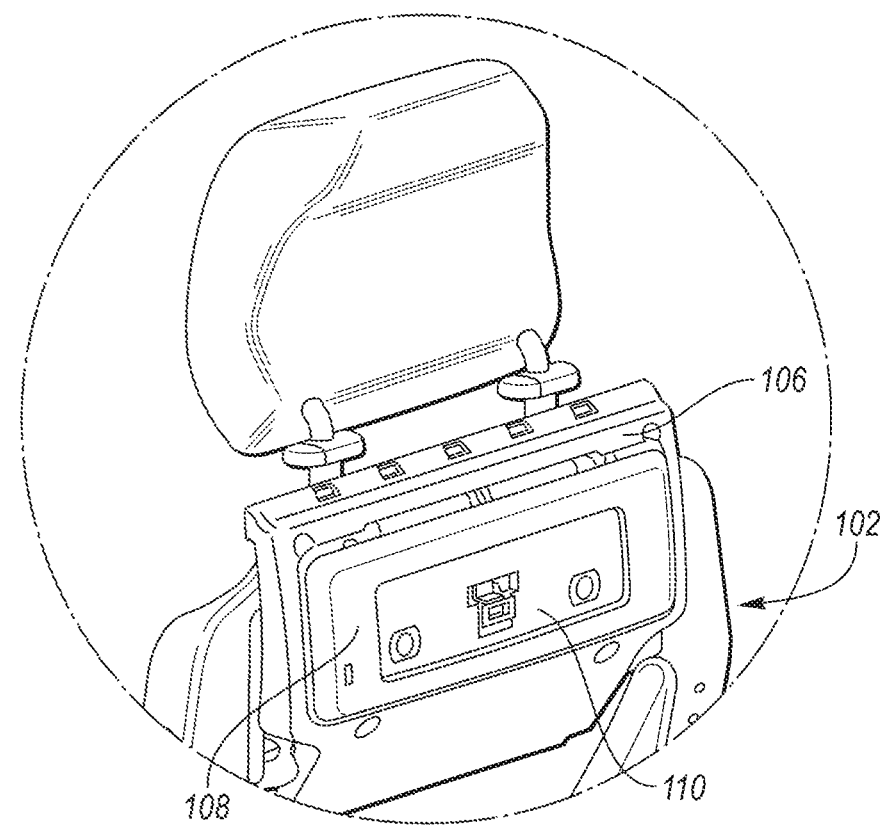
FIG. 2 is a perspective view of the tablet device holder.

FIG. 2 is a perspective view of the tablet device holder 102. The device holder 102 may include a housing 106, which may be integrated with the rear portion 104 of the seat. The rear portion 104 may also form the housing 106. The housing 106 may be configured to receive the tablet. The device holder 102 may include a bezel 108 configured to attach to the housing 106 and configured to surround and maintain the tablet device within the housing 106. The bezel 108 may define an opening 110 to allow viewing and interaction with the tablet 103 once the tablet 103 is arranged within the device holder 102.

To arrange the tablet within the device holder 102, the bezel 108 may be removed, at least partially, from the housing 106. That is, the bezel 108 may be removed to place the tablet within the housing 106, and replaced and fixed to the housing 106 to maintain the tablet within the housing 106.

FIGS. 3A and 3B are perspective views of a rear portion of the tablet device holder 102 illustrating an attachment mechanism 116. The device holder 102 may include an attachment mechanism configured to fix the bezel 108 to the housing 106. The attachment mechanism may include a bezel part 118 and a housing part 120 whereby the bezel part 118 may engage with the housing part 120 to fix the bezel 108 to the housing 106. The attachment mechanism 116 is described in more detail below.

FIG. 4 is a perspective view of the bezel part 118 of the attachment mechanism 116. The bezel part 118 may extend from the rear of the bezel 108, as illustrated in FIGS. 3A and 3B. The bezel part 118 may include a base 126 and a projection 128 extending therefrom. The projection 128 may include a first portion 130 extending outwardly from the base and a second portion 132 extending upward from the first portion 130, approximately parallel with the base 126. Thus, the bezel part 118 may form a u-like shape, as illustrated in FIG. 4.

The first portion 130 may define a first opening 136 and the second portion 132 may define a second opening 138. Each of the openings 136, 138 may be configured to engage with portions for the housing part 120, as described herein.

Figure 5A:
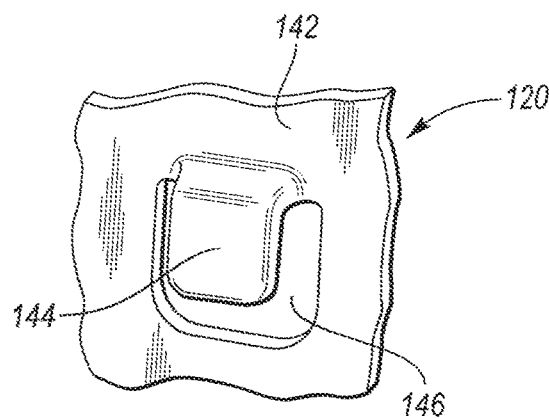
FIG. 5A is a perspective view of a front side of the housing part of the attachment mechanism.

FIG. 5A is a perspective view of a front side, or second side 142, of the housing part 120. The housing part 120 may include a hook 144 extending outwardly downward. The housing 106 may define a housing opening 146. The hook 144 may extend in front of at least a portion of the opening 146, as illustrated in FIG. 5A.

Figure 5B:
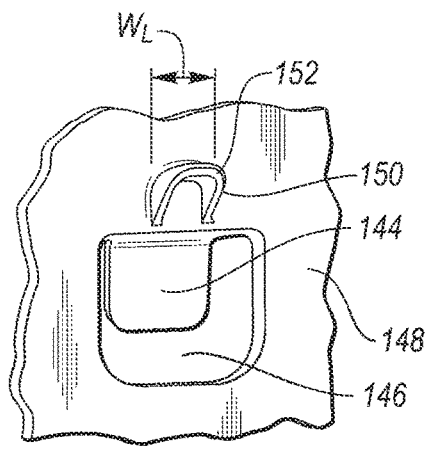
FIG. 5B is a perspective view of a rear side of the housing part of the attachment mechanism.

FIG. 5B is a perspective view of a rear side, or first side 140, of the housing part 120. The housing part 120 may include a lip 150. The lip 150 may be arranged above the housing opening 146 and may have an upper surface 152. The lip 150 may form a U-like shape and may be configured to engage with the second opening 138 of the bezel part 118.

Figure 6A:
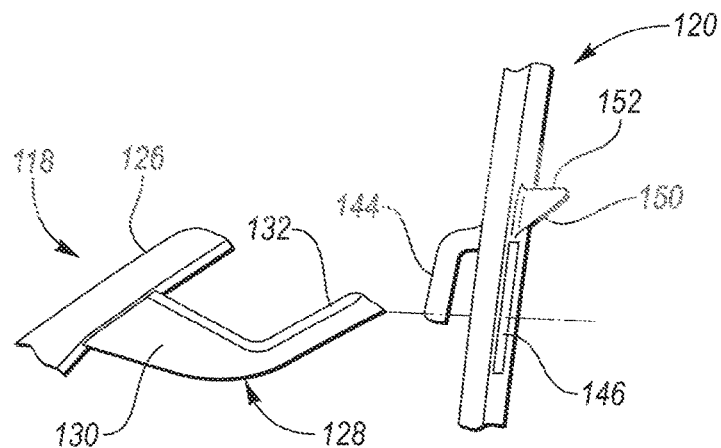
FIG. 6A is a side view of the attachment mechanism in an uninstalled state.
Figure 6B:
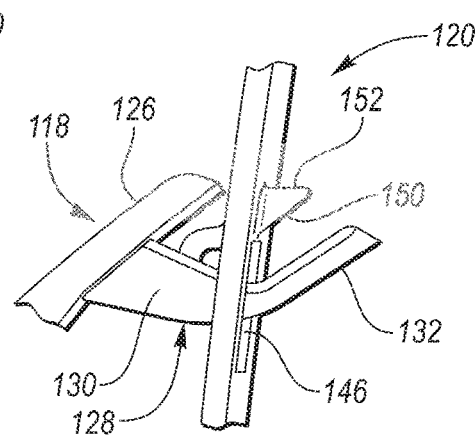
FIG. 6B is a side view of the attachment mechanism in a partially installed state.
Figure 6C:
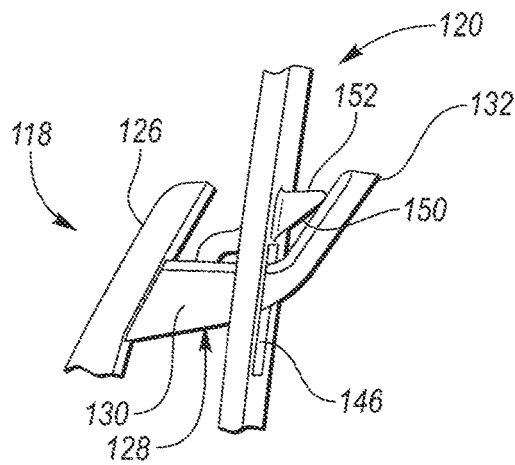
FIG. 6C is another perspective view of the attachment mechanism in a partially installed state.

FIGS. 6A-6D are side views of the attachment mechanism 116 in various installation states. FIG. 6A illustrates the attachment mechanism 116 in an uninstalled state were the bezel part 118 and the housing part 120 are not engaging each other. FIG. 6B is a side view of the attachment mechanism in a partially installed state illustrating how the projection 128 of the bezel part 118 may be inserted into the housing opening 146. As the second portion 132 of the projection 128 is inserted into the opening 146, the hook 144 of the housing part 120 may enter the first opening 136 of the projection 128. As the second portion 132 is pushed further through the opening 146, the hook 144 may extend further through the first opening 136, as shown in FIG. 6C, which is a perspective view of the attachment mechanism in another, further partially installed state. The bezel part 118 may be rotated as it is inserted into the housing opening 146.

Figure 6D:
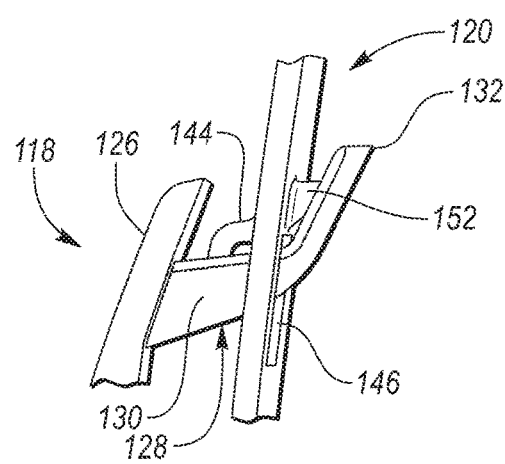
FIG. 6D is a side view of the attachment mechanism in an installed state.

Once the second portion 132 has been inserted through the opening 146, the second portion 132 may be moved inward toward the rear of the housing part 120, as illustrated in FIG. 6D, which is a side view of the attachment mechanism in an installed state. The second opening 138 within the second portion 132 may then engage the lip 150 arranged on the rear of the housing part 120. The second opening 138 may receive the lip 150, and rest on the upper surface 152 thereof. The lip 150 may have a lip width $W_l$ (as best shown in FIG. 5B) corresponding to an opening width $W_o$ of the second opening 138 (as best shown in FIG. 4) so that the sides of the second opening 138 may engage with sides of the lip 150, further preventing axial movement of the bezel 108 with respect to the housing 106.

Figure 7A:
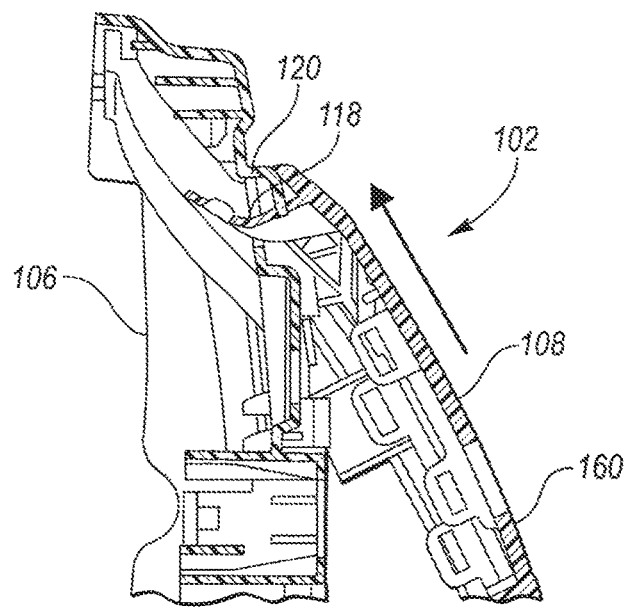
FIG. 7A is a side view of the tablet device holder of FIG. 1 in an uninstalled state.
Figure 7B:
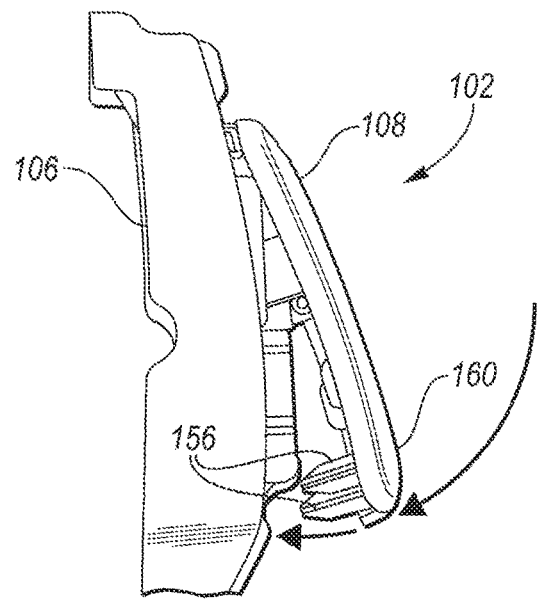
FIG. 7B is a side view of the tablet device holder of FIG. 1 in an installed state.

FIGS. 7A and 7B are side views of the tablet device holder 102 of FIG. 1 in an uninstalled state. FIG. 7A illustrates a cross-sectional side view of the tablet device holder 102 while FIG. 7A illustrates a side view. During installation of the bezel 108 onto the housing 106, the bezel projection 128 may be inserted into the housing opening 146 at an upward angle, as shown in FIG. 6A. As the projection 128 is inserted through the opening 146, the hook 144 may be concurrently inserted into the first opening 136. Once the projection 128 is fully inserted into the opening 146, the projection 128 may be directed upward so that the second opening 138 of the bezel part 118 may receive the lip 150 of the housing part 120. The second opening 138 may engage the upper surface 152 of the lip 150 to maintain the bezel part 118 on the housing part 120.

As illustrated in FIG. 7B, once the bezel part 118 has engaged the housing part 120, a bottom portion 160 of the bezel 108 may be pushed inward towards the housing 106. At least one tab 156 may extend outward from an interior of the bezel 108 and each tab 156 may be configured to be received by the housing 106 to further facilitate the engagement between the bezel 108 and the housing 106.

Figure 7C:
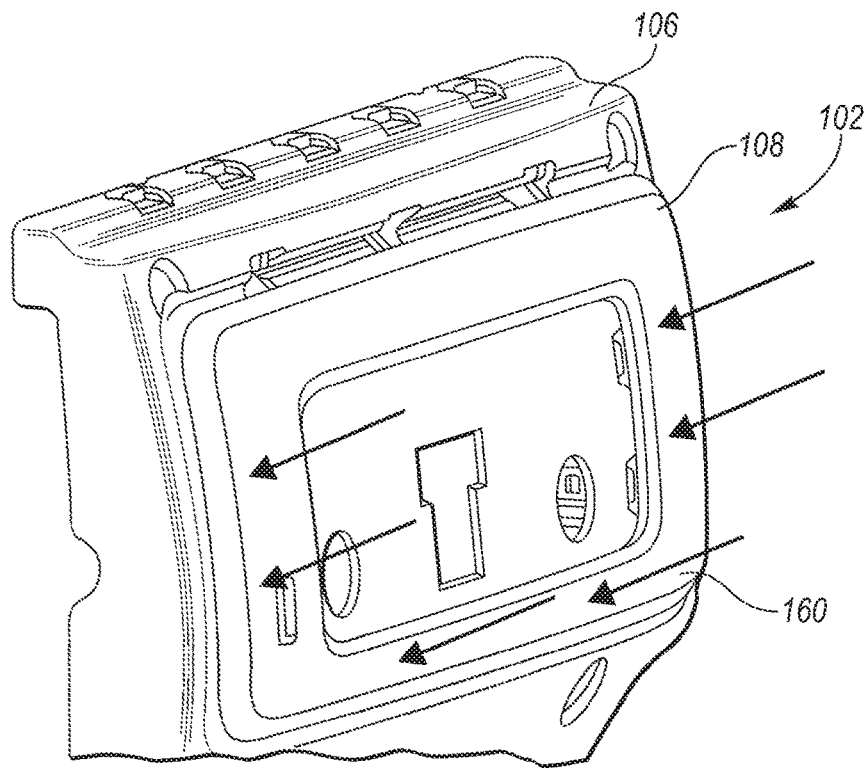
FIG. 7C is a perspective view of the tablet device holder of FIG. 1 in an installed state.

FIG. 7C illustrates a perspective view of the tablet device holder 102 in an installed state where force is applied to the bezel 108 to fix the bezel 108 to the housing 106.

The attachment mechanism 116 may be injection molded, or made from other materials to form a rigid part. Because of this, easier tool manufacturing may be used due to core-cavity manufacturability of the feature with only one action. While a single attachment mechanism is disclosed and discussed herein, more than one attachment mechanism may be arranged within the tablet device holder 102. In one example, an attachment mechanism 116 may be included on each side of the bezel 108. Moreover, while the holder 102 is described with respect to placement on a seat assembly 100, other implementations may be appreciated such as fixing a tablet to other surfaces including but not limited to walls, desks, etc., and other types of vehicle seats such as airplanes, trains, etc. Furthermore, the attachment mechanism 116 may be used to fix two parallel parts together other than a bezel 108 and housing 106.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An attachment mechanism for connecting a bezel and a housing, comprising:
    a first part defining an opening and having a lip extending outwardly from a first side of the first part; and
    a second part having a projection defining a projection opening configured to be received by the opening at the first side and to receive the lip to fix the second part to the first part in an installed state, wherein the first part includes a hook extending outwardly downward from the first part at a side opposite of the lip, and wherein the hook extends downward to partially obstruct the opening of the first part.

2. The mechanism of claim 1, wherein the projection includes a first portion defining a first opening and a second portion defining the projection opening, the first opening configured to receive the hook of the first part upon the projection being inserted through the opening of the first part to prevent lateral movement of the second part with respect to the first part.

3. The mechanism of claim 2, wherein the hook is received by the first opening concurrently with the projection being received by the opening of the first part.

4. The mechanism of claim 1, wherein the lip has a lip width corresponding to a projection opening width to prevent axial movement of the second part with respect to the first part when the projection opening receives the lip.

5. The mechanism of claim 1, wherein at least one of the first part and the second part are formed from injection molding.

6. An attachment mechanism, comprising:
    a first part defining an opening and having a lip extending outwardly from a first side of the first part; and
    a second part having a projection defining a projection opening configured to be received by the opening at the first side and to receive the lip to fix the second part to the first part in an installed state, wherein the first part includes a hook extending outwardly downward from the first part at a side opposite of the lip, and wherein the projection includes a first portion defining a first opening and a second portion defining the projection opening, the first opening configured to receive the hook of the first part upon the projection being inserted through the opening of the first part to prevent lateral movement of the second part with respect to the first part.

7. The mechanism of claim 6, wherein the hook is received by the first opening concurrently with the projection being received by the opening of the first part.

8. The mechanism of claim 6, wherein the hook extends downward to partially obstruct the opening of the first part.

9. The mechanism of claim 6, wherein the lip has a lip width corresponding to a projection opening width to prevent axial movement of the second part with respect to the first part when the projection opening receives the lip.

10. The mechanism of claim 6, wherein at least one of the first part and the second part are formed from injection molding.

11. An assembly, comprising:
    a first part defining an opening and having a lip extending outwardly from a first side of the first part and a hook extending outwardly downward from the first part at a side opposite the lip; and
    a second part having a projection defining a projection opening configured to be received by the opening at the first side and to receive the lip to fix the second part to the first part in an installed state, the projection defining a first opening configured to receive the hook of the first part upon the projection being inserted through the opening of the first part to prevent lateral movement of the second part with respect to the first part.

12. The mechanism of claim 11, wherein the hook is received by the first opening concurrently with the projection being received by the opening of the first part.

13. The mechanism of claim 11, wherein the hook extends downward to partially obstruct the opening of the first part.

14. The mechanism of claim 11, wherein the lip has a lip width corresponding to a projection opening width to prevent axial movement of the second part with respect to the first part when the projection opening receives the lip.

15. The mechanism of claim 11, wherein at least one of the first part and the second part are formed from injection molding.

* * * * *